US008170772B2

(12) United States Patent
Nagashima et al.

(10) Patent No.: US 8,170,772 B2
(45) Date of Patent: May 1, 2012

(54) METHOD OF REDUCING ICING-RELATED ENGINE MISFIRES

(75) Inventors: Dan Nagashima, Dublin, OH (US); John P. Mullett, Powell, OH (US); Takashi Isobe, Dublin, OH (US); Kenji D. Matsuura, Marysville, OH (US)

(73) Assignee: Honda Motor Company, Ltd., Tokyo (JP)

(*) Notice: Subject to any disclaimer, the term of this patent is extended or adjusted under 35 U.S.C. 154(b) by 0 days.

(21) Appl. No.: 13/102,151

(22) Filed: May 6, 2011

(65) Prior Publication Data

US 2011/0208406 A1 Aug. 25, 2011

Related U.S. Application Data

(62) Division of application No. 12/254,497, filed on Oct. 20, 2008, now abandoned.

(51) Int. Cl.
*G06F 19/00* (2011.01)
*G06G 7/70* (2006.01)
*F02P 15/00* (2006.01)

(52) U.S. Cl. .................................... 701/101; 123/179.5

(58) Field of Classification Search ............... 123/48.16, 123/572, 573, 574, 339.11, 339.15, 406.13, 123/406.52, 179.5; 701/101, 102, 103, 104; 73/114.31
See application file for complete search history.

(56) References Cited

U.S. PATENT DOCUMENTS

| | | | | |
|---|---|---|---|---|
| 6,192,866 | B1 * | 2/2001 | Araki et al. | 123/479 |
| 2003/0075146 | A1 * | 4/2003 | Niki et al. | 123/396 |
| 2007/0017482 | A1 * | 1/2007 | Nakashima et al. | 123/399 |
| 2008/0078356 | A1 * | 4/2008 | Akagawa | 123/403 |

OTHER PUBLICATIONS

Sizo S. Vilakazi, Office Action including Election/Restrictions, Notification Date of Jul. 23, 2010, U.S. Appl. No. 12/254,497, Titled: Method of Reducing Icing-Related Engine Misfires, Filed: Oct. 20, 2008, Inventors: Dan Nagashima et al., 6 pages.
Sizo B. Vilakazi, Final Office Action, Notification Date of Sep. 16, 2010, U.S. Appl. No. 12/254,497, Titled: Method of Reducing Icing-Related Engine Mosfires, Filed: Oct. 20, 2008, Inventors: Dan Nagashima et al., 20 pages.
Sizo B. Vilakazi, Final Office Action, Notification Date of Mar. 4, 2011, U.S. Appl. No. 12/254,497, Titled: Method of Reducing Icing-Related Engine Misfires, Filed: Oct. 20, 2008, Inventors: Dan Nagashima et al., 12 pages.

* cited by examiner

*Primary Examiner* — Stephen K Cronin
*Assistant Examiner* — Sizo Vilakazi
(74) *Attorney, Agent, or Firm* — Ulmer & Berne LLP

(57) ABSTRACT

A method of reducing icing-related engine misfires during operation of a vehicle is provided. The vehicle can include an engine and an engine control unit operable for at least partially controlling operation of the engine. The vehicle can further include a plurality of sensors in electrical communication with the engine control unit. The engine can include an air intake system and an exhaust system, wherein the air intake system can include a positive crankcase ventilation valve. The method includes predicting the presence of ice within the air intake system based upon an input to the engine control unit from at least one of the sensors.

4 Claims, 4 Drawing Sheets

METHOD OF REDUCING ICING-RELATED ENGINE MISFIRES

CROSS-REFERENCE TO RELATED APPLICATION

This application is a divisional of U.S. patent application Ser. No. 12/254,497, "Method of Reducing Icing-Related Engine Misfires", filed Oct. 20, 2008 now abandoned, which is hereby expressly incorporated by reference herein in its entirety.

TECHNICAL FIELD

A method of reducing icing-related engine misfires during operation of a vehicle.

BACKGROUND

Positive crankcase ventilation "PCV" valves are widely used to control the flow of crankcase gases in internal combustion engines of various vehicles, such as automobiles. During operation of internal combustion engines, a portion of the combustion gases within each cylinder can flow past the respective piston rings into the engine crankcase located below the pistons. These "blowby" combustion gases can be vented to avoid an undesirable increase in pressure inside the engine. A PCV valve and associated flow passages and conduits can route the unburned "blowby" gases from each cylinder into an air intake manifold and back into the combustion chambers of the cylinders where the gases can be reburned. Accordingly, in this manner PCV valves also function as emission control devices.

During certain operating conditions, ice can accumulate within the PCV valve, the associated flow passages and conduits, or other portions of the air intake system of the engine. As the operating conditions change, the accumulated ice can melt, causing water to be introduced into the combustion chambers of one or more cylinders. This can subsequently cause the engine to misfire.

SUMMARY

A method of reducing icing-related engine misfires during operation of a vehicle is provided. The vehicle can include an engine and an engine control unit operable for at least partially controlling operation of the engine. The vehicle can further include a plurality of sensors in electrical communication with the engine control unit. The engine can include an air intake system and an exhaust system and the air intake system can include a positive crankcase ventilation valve. According to one embodiment, the method includes predicting the presence of ice within the air intake system based upon an input to the engine control unit from at least one of the sensors. The method further includes pumping melted ice out of the air intake system into the exhaust system of the engine.

According to another embodiment, the method includes predicting the presence of ice within the air intake system based upon an input to the engine control unit from at least one of the sensors and also includes starting the engine in response to an input from an operator of the vehicle. The method further includes advancing ignition timing, relative to a first ignition timing schedule, for a predetermined period of time. The method further includes operating the engine according to the first ignition timing schedule, wherein operating the engine is completed after the advancing ignition timing.

According to another embodiment, the method includes predicting the presence of ice within the air intake system based upon an input to the engine control unit from at least one of the sensors and also includes starting the engine in response to an input from an operator of the vehicle. The method further includes raising a speed of the engine, relative to a predetermined engine idle speed, for a predetermined period of time. The method further includes operating the engine at the predetermined engine idle speed, wherein operating the engine is completed after the raising a speed of the engine.

A vehicle is provided that includes an engine and a means for reducing icing-related misfires of the engine.

BRIEF DESCRIPTION OF THE DRAWINGS

Various embodiments of a method of reducing icing-related engine misfires during operation of a vehicle will become better understood with regard to the following description, appended claims and accompanying drawings wherein:

DETAILED DESCRIPTION

Figure 1:
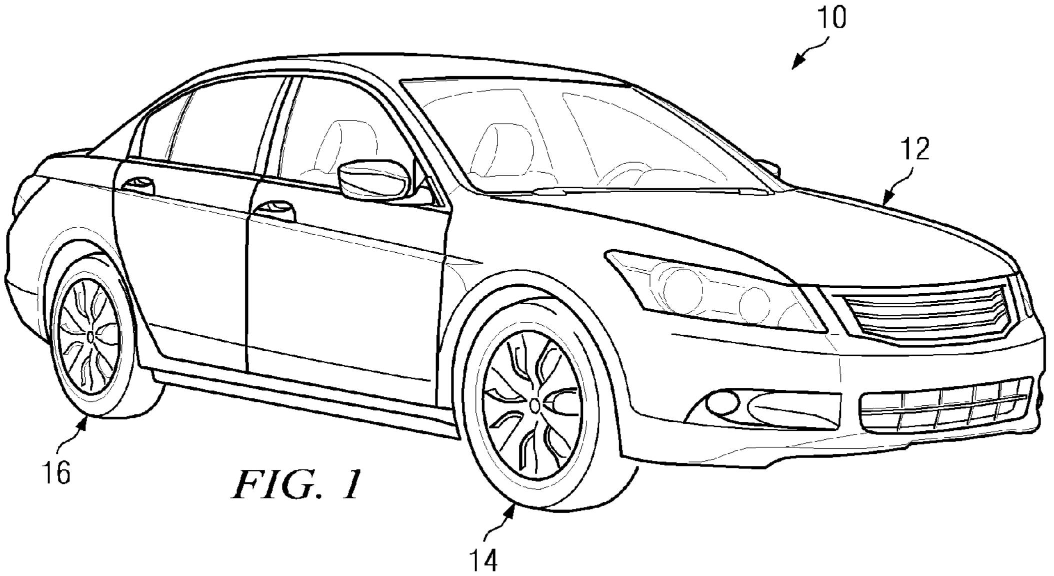
FIG. 1 is a perspective view of a vehicle that can incorporate a method of reducing icing-related engine misfires during operation of the vehicle.

Referring to the drawings, FIG. 1 illustrates a vehicle 10 that can incorporate a method of reducing the occurrence and/or severity of icing-related engine misfires during operation of vehicle 10. Embodiments of the method can be utilized to reduce engine misfires in various vehicles, such as an automobile as shown in FIG. 1, as well as a variety of other vehicles including trucks, vans and sport utility vehicles. Vehicle 10 can include a frame (not shown), a body 12 supported by the frame, a pair of front wheels 14 (one shown) and a pair of rear wheels 16 (one shown). Wheels 14 and 16 can be suspended from the frame and are rotatable relative to the frame. Vehicle 10 can further include an internal combustion engine 18, with a portion of engine 18 being shown schematically in FIG. 2. A drivetrain (not shown) can be included that is operable for transferring torque from the engine 18 to the front wheels 14 and/or the rear wheels 16.

Figure 2:
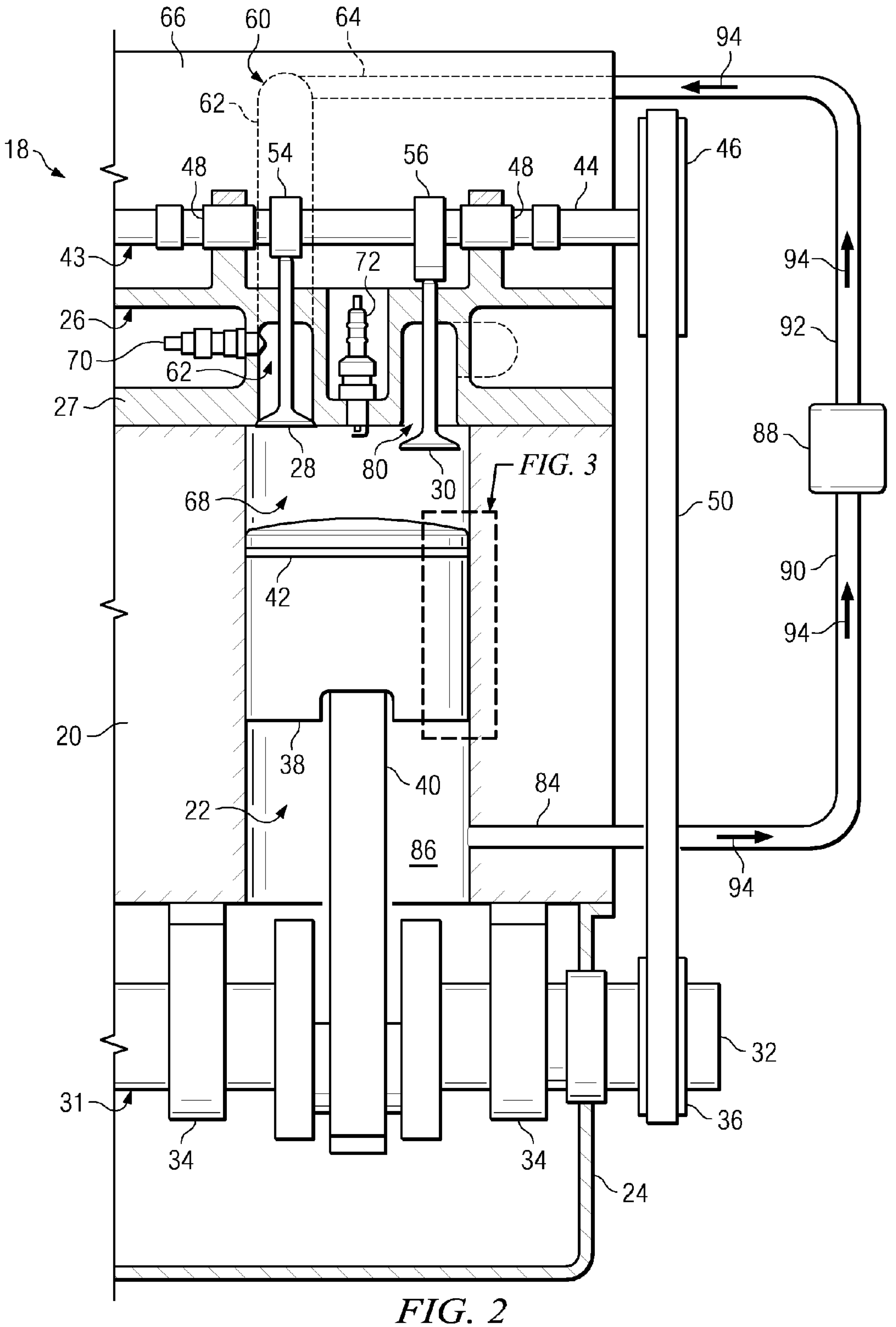
FIG. 2 is a cross-sectional view of a portion of an engine included in the vehicle shown in FIG. 1.
Figure 3:
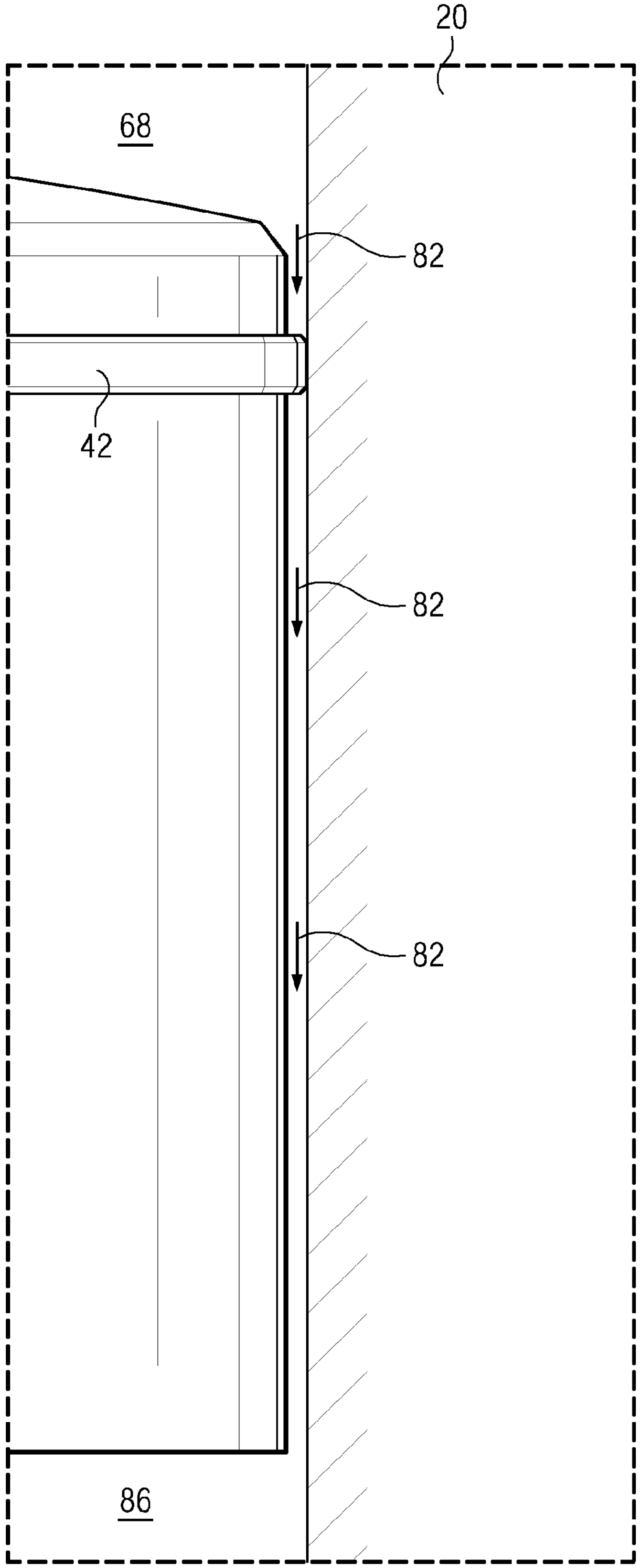
FIG. 3 is an enlarged cross-sectional view of the encircled portion of the engine shown in FIG. 2.

Referring to FIGS. 2 and 3, engine 18 can include a block 20 that defines a plurality of cylinders 22 (one shown in FIG. 2). Engine 18 can also include a crankcase 24 integral with block 20, with the crankcase 24 being in fluid communication with each of the cylinders 22. Engine 18 can also include a valve assembly 26 having a mount portion 27 integral with the block 20, a plurality of intake valves 28 (one shown in FIG. 2) that are movable relative to the mount portion 27, and a plurality of exhaust valves 30 that are movable relative to the mount portion 27. A crankshaft assembly 31 can include a crankshaft 32 that can extend through crankcase 24, which can contain a lubricant such as oil. The crankshaft 32 can be journalled within one or more bearing assemblies 34, which can be supported by the block 20 of engine 18. As shown in FIG. 2, the crankshaft assembly 31 can also include a pulley 36 mounted on one end of crankshaft 32 that is external of crankcase 24, such that the pulley 36 is rotatable with the crankshaft 32. An opposite end of crankshaft 32 can also be positioned external of crankcase 24 and can carry another pulley or device (not shown) that can be rotatably coupled to a transmission (not shown) or other drivetrain component of vehicle 10.

Engine 18 can also include a plurality of pistons 38 (one shown in FIG. 2), with each piston 38 being disposed within one of the cylinders 22. Each piston 38 can be coupled to the crankshaft 32 by a connecting rod 40. Each connecting rod 40 can be coupled to a portion of crankshaft 32 which is offset relative to adjacent portions of crankshaft 32, to produce a reciprocating motion of the connecting rods 40 and pistons 38 in response to rotation of crankshaft 32 in any manner known in the art. Engine 18 can also include a plurality of annular piston rings 42 (one shown in FIG. 2), with each piston ring 42 surrounding one of the pistons 38 and positioned radially between the piston 38 and the block 20 of engine 18.

Engine 18 can also include a camshaft assembly 43 having a camshaft 44 and a pulley 46 mounted on one end of camshaft 44. One or more support members 48 can journal camshaft 44 within the mount portion 28 of valve assembly 26. Crankshaft 32 and camshaft 44 can be rotatably coupled by an endless, flexible drive member 50, which can be a belt or a chain (e.g., if sprockets are used in lieu of pulleys 36 and 46), that is wound partially around and extends between pulleys 36 and 46. Camshaft 44 can include a plurality of lobes 54 (one shown in FIG. 2) and a plurality of lobes 56 (one shown in FIG. 2), with each of the lobes 54 contacting a respective one of the intake valves 28 and each of the lobes 56 contacting a respective one of the exhaust valves 30. Intake valves 28 and exhaust valves 30 reciprocate under the rotation of lobes 54 and 56, respectively. In some embodiments, the camshaft assembly 43 can include a mechanism (not shown) that can vary the shape of lobes of a camshaft to vary the opening and closing of intake valves 28 and exhaust valves 30 during the operation of engine 18.

Engine 18 can include an air intake system 60 that is operable for supplying ambient air to each of the cylinders 22 during operation of engine 18. The air intake system 60 can include flow passages 62 and 64, each being defined by an intake manifold 66. The flow passage 62 can be in fluid communication with upstream components, e.g., an air filter housing (not shown), of vehicle 10 that supply ambient air to flow passage 62. Flow passage 62 can also be in fluid communication with flow passage 64 and can be in selective fluid communication with each of the cylinders 22. As shown in FIG. 2 with respect to one of the intake valves 28, each of the intake valves 28 can be positioned within the flow passage 62. During intake strokes, lobes 54 move the respective intake valves 28 to an open position, such that the flow passage 62 is in fluid communication with a combustion chamber 68, of each respective cylinder 22. Combustion chamber 68 is a portion of cylinder 22 positioned above piston 38.

Figure 4:
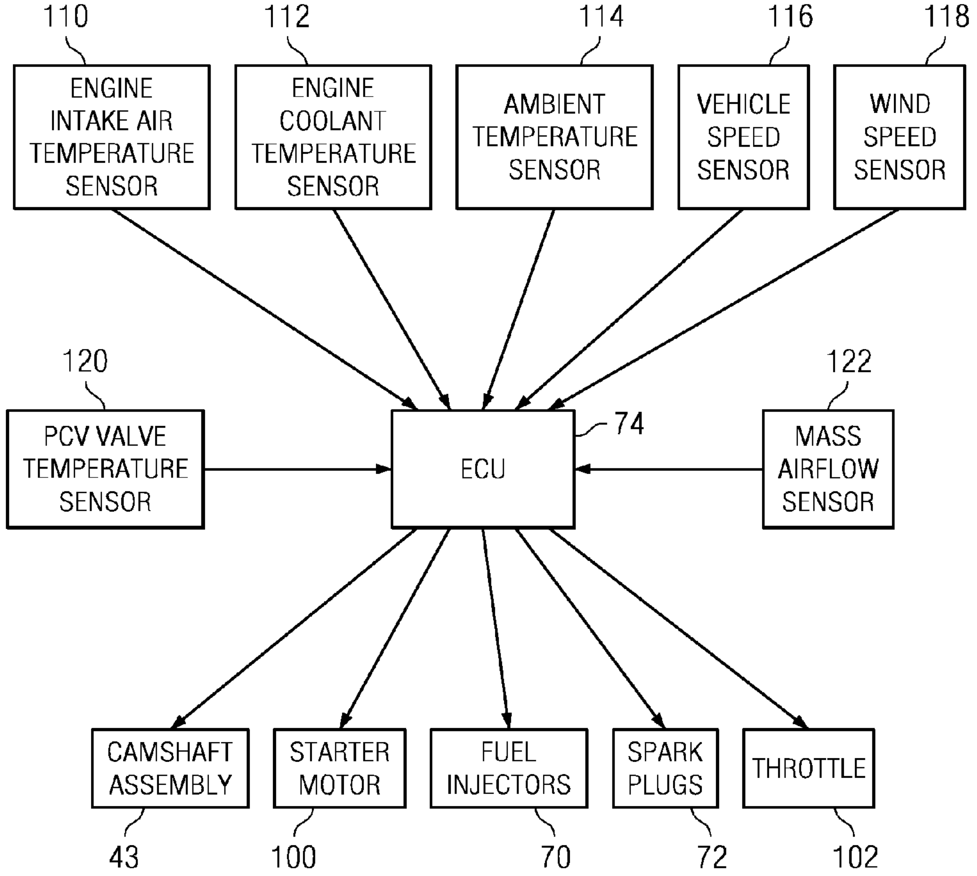
FIG. 4 is a schematic illustration of an engine control unit (ECU), a plurality of sensors in electrical communication with the ECU, various components of the engine shown schematically and partially in FIGS. 2 and 3, and other components of the vehicle shown in FIG. 1 that are also in electrical communication with the ECU.

Engine 18 can include a plurality of fuel injectors 70 and a plurality of spark plugs 72. Operation of fuel injectors 70 and spark plugs 72 can be controlled by an engine control unit (ECU) 74 (shown schematically in FIG. 4), which can be a processor-based controller. Each of the fuel injectors 70 can extend into a portion of the air intake system 60, for example into flow passage 62 as shown in FIG. 2 with respect to one of the fuel injectors 70, such that injected fuel can be mixed with intake air. The resultant combustible mixture can be provided to the combustion chambers 68 of the cylinders 22 when the respective intake valves 28 are open. During the exhaust stroke, for each cylinder 22, the respective exhaust valve 30 is an open position, as shown in FIG. 2, and the respective intake valve 28 is closed, which permits gases within the combustion chamber 68 to be vented to an exhaust system 80 (shown partially in FIG.

When combustion occurs within the combustion chambers 68 of engine 18, a portion of the combustion gases, which can be referred to as "blowby" combustion gases, can flow past the respective piston ring(s) 42 in one or more of the cylinders 22, and then into the crankcase 24, as indicated by flow arrows 82 in FIG. 3 with respect to one of the cylinders 22. In order to prevent an undesirable buildup of pressure within crankcase 24, the air intake system 60 can provide a flowpath to return the "blowby" gases to the combustion chambers 68, so that the "blowby" gases can be reburned. For example, the air intake system 60 can include a plurality of flow passages 84 (one shown in FIG. 2) defined by block 20 of engine 18, with each of the flow passages 84 being in fluid communication with a portion 86 of the respective cylinder 22 that is disposed below the respective piston 38.

A positive crankcase ventilation (PCV) valve 88, which can be a one-way check valve, can be included in the air intake system 60. A plurality of conduits 90 (one shown in FIG. 2) can be provided that establish fluid communication between the PCV valve 88 and respective ones of the flow passages 84 formed in block 20 of engine 18. A conduit 92 can be provided that is in fluid communication with the PCV valve 88 and flow passage 64. Accordingly, "blowby" gases within cylinders 22 and/or crankcase 24 can be vented into the flow passage 64 and subsequently into the combustion chambers 68, via flow passage 62, as shown by flow arrows 94 in FIG. 2. In addition to venting crankcase 24, routing "blowby" gases into the combustion chambers 68 of cylinders 22 provides emissions control, since the "blowby" gases can be reburned. PCV valve 88 prevents the flow of intake air into the portions 86 of cylinders 22 positioned below the respective pistons 38. It will be appreciated that the intake air system 60 can include additional or fewer flow passages and flow conduits than those illustrated schematically in FIG. 2, and that these can be provided in any of a variety of suitable alternative arrangements.

The ECU 74 can be in electrical communication with various components of engine 18 and other components of vehicle 10 such that the ECU 74 can at least partially control the operation of engine 18. For example, as shown schematically in FIG. 4, the ECU 74 can be in electrical communication with the camshaft assembly 43, such as when the camshaft assembly 43 includes a mechanism that can vary the shape of the lobes of a camshaft during operation of vehicle 10. The ECU 74 can also be in electrical communication with fuel injectors 70, spark plugs 72, a starter motor 100 and a throttle 102. The starter motor 100 can be rotatably coupled to the crankshaft 32, for example via a flywheel (not shown) secured to the crankshaft 32 for rotation therewith. The throttle 102 can be coupled to a fuel system component, for example a fuel pump (not shown) that can supply fuel to the fuel injectors 70.

Vehicle 10 can include a plurality of sensors that can be in electrical communication with the ECU 74, and can thereby provide one or more inputs (e.g., in the form of electrical signals) to the ECU 74. For example, vehicle 10 can include an engine intake air temperature sensor 110, an engine coolant temperature sensor 112, an ambient temperature sensor 114, a vehicle speed sensor 116, a wind speed sensor 118, a PCV valve temperature sensor 120 and a mass airflow sensor 122. Each of the sensors 110, 112, 114, 116, 118, 120 and 122 can be in electrical communication with the ECU 74 as shown schematically in FIG. 4.

During certain ambient conditions, or combinations of ambient conditions and operating conditions of vehicle 10, ice can form in one or more portions of the air intake system 60, for example within one or more of the PCV valve 88, conduits 90 and 92 and flow passages 62, 64 and 84. When ambient conditions and/or operating conditions of the vehicle 10 change, some or all of the ice built up within the air intake system 60 can melt and flow into the combustion chamber 68 of one or more of cylinders 22. This can result in undesirable misfires of engine 18 during operation of vehicle 10.

Figure 5:
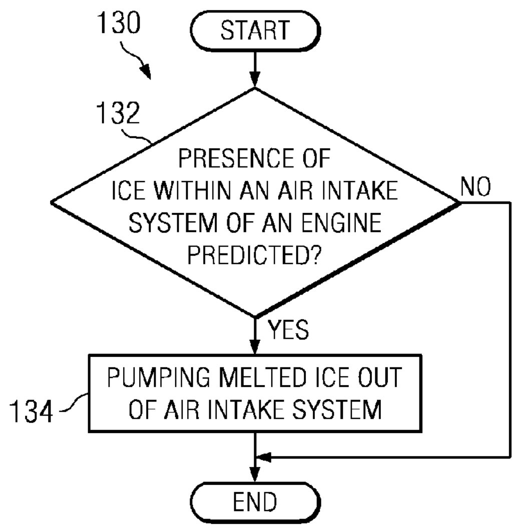
FIG. 5 is a flow chart illustrating a method of reducing icing-related engine misfires during operation of a vehicle according to one embodiment.

A method 130 of reducing icing-related misfires of engine 18 during operation of vehicle 10, according to one embodiment, is illustrated in the flow chart shown in FIG. 5. Method 130 can include predicting the presence of ice within the air intake system 60, as indicated at 132, based upon an input to the ECU 74 from at least one of the following sensors: the engine intake air temperature sensor 110; the engine coolant temperature sensor 112; the ambient temperature sensor 114; the vehicle speed sensor 116; the wind speed sensor 118; the PCV valve temperature sensor 120; and the mass airflow sensor 122. Predicting the presence of ice can include processing the input from one or more of the sensors 110, 112, 114, 116, 118, 120 and 122 with ECU 74. Such processing can include comparing the input from individual ones of the sensors 110, 112, 114, 116, 118, 120 and 122, or comparing the inputs from various combinations of and relationships among the sensors 110, 112, 114, 116, 118, 120 and 122, to one or more predetermined values. If the presence of ice within the air intake system 60 is predicted, the melted ice can be pumped out of the air intake system 60, as indicated at 134, into the exhaust system 80. Pumping the melted ice out of the air intake system 60 can be accomplished by engaging the starter motor 100 in response to an input from an operator of vehicle 10 for a predetermined period of time without energizing the fuel injectors 70, and therefore without injecting fuel into the engine 18, and also without energizing the spark plugs 72. The operation of fuel injectors 70 and spark plugs 72 can be controlled by ECU 74.

Figure 6:
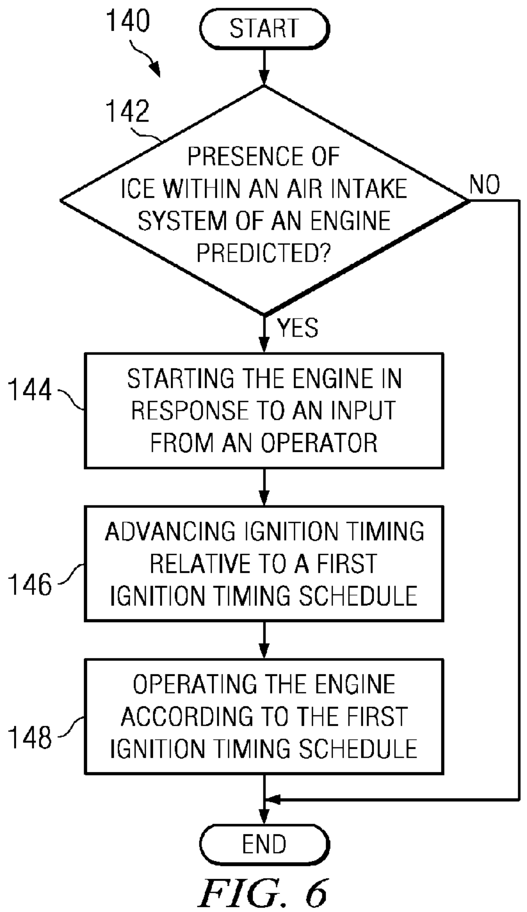
FIG. 6 is a flow chart illustrating a method of reducing icing-related engine misfires during operation of a vehicle according to another embodiment.

A method 140 of reducing icing-related misfires of engine 18 during operation of vehicle 10, according to another embodiment, is illustrated in the flow chart shown in FIG. 6. The presence of ice within air intake system 60 can be predicted, as indicated at 142, in the same manner as discussed previously with respect to method 130. If the presence of ice within the air intake system 60 is predicted, engine 18 can be started in response to an input from an operator, as indicated at 144. Method 140 can further include advancing ignition timing relative to a first ignition timing schedule, as indicated at 146, for a predetermined period of time. In one embodiment, the predetermined period of time can be determined by a measurement of mass airflow through engine 18 using the mass airflow sensor 122. Advancing the ignition timing results in the combustible mixtures within combustion chambers 68 being ignited before the respective ones of the pistons 38 reach "top dead center" within the respective ones of the cylinders 22. This can result in an increase of torque produced by engine 18 and reduces the sensitivity of engine 18 to poor air-to-fuel mixture ratios within the combustion chambers 68. After advancing the ignition timing for the predetermined period of time, engine 18 can be operated according to the first ignition timing schedule, as indicated at 148. The first ignition timing schedule can be configured to facilitate optimum efficiency of engine 18 during normal operation of engine 18.

Figure 7:
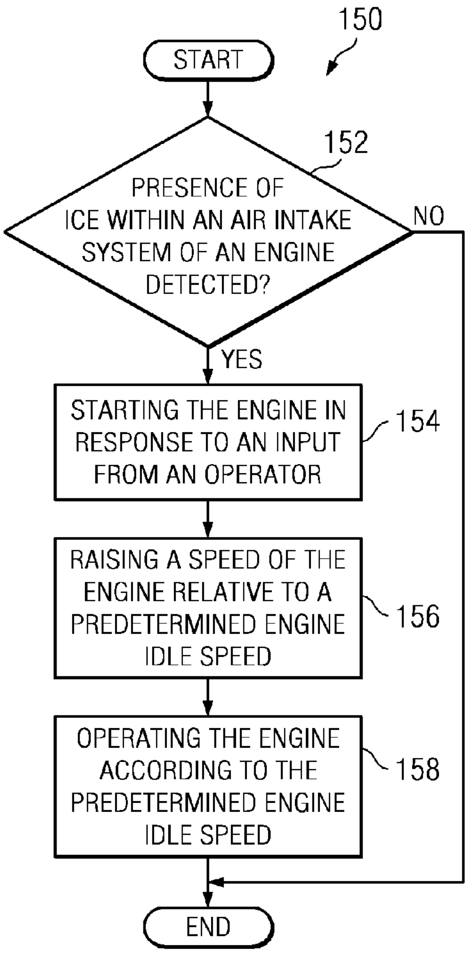
FIG. 7 is a flow chart illustrating a method of reducing icing-related engine misfires during operation of a vehicle according to another embodiment.

A method 150 of reducing icing-related misfires in engine 18 during operation of vehicle 10, according to another embodiment, is illustrated in the flow chart shown in FIG. 7. Method 150 includes predicting the presence of air within air intake system 60 of engine 18, as indicated at 152, which can be completed in the manner discussed previously with respect to method 130. If ice within the air intake system 60 is predicted, engine 18 can be started in response to an input from an operator, as indicated at 154. The speed of engine 18 can be raised relative to a predetermined engine idle speed, as indicated at 156, for a predetermined period of time. After raising the speed of engine 18 relative to the predetermined engine idle speed for the predetermined period of time, engine 18 can be operated according to the predetermined engine idle speed, as indicated at 158. The predetermined engine idle speed can facilitate optimum efficiency of engine 18 during normal operation of engine 18. Utilization of method 150 can also reduce the sensitivity of engine 18 to poor air-to-fuel mixture ratios within the combustion chambers 68 during such time that any melted ice remains within or is being discharged from the combustion chambers 68.

ECU 74 can be configured to execute any one of the methods 130, 140 and 150 and can alternatively be configured to select which one of the methods 130, 140 and 150 is executed. Methods 130, 140 and 150 can be implemented on a wide variety of vehicles, such as an automobile as shown in FIG. 1, as well as trucks, vans and sport utility vehicles and can be used with internal combustion engines having a wide variety of configurations.

While various embodiments of a method of reducing icing-related engine misfires during operation of a vehicle have been illustrated by the foregoing description and have been described in considerable detail, it is not intended to restrict or in anyway limit the scope of the appended claims to such detail. Additional modifications will be readily apparent to those skilled in the art.

What is claimed is:

1. A method of reducing icing-related engine misfires during operation of a vehicle, the vehicle comprising an engine and an engine control unit operable for at least partially controlling operation of the engine, the vehicle further comprising a plurality of sensors in electrical communication with the engine control unit, the engine comprising an air intake system and an exhaust system, wherein the air intake system comprises a positive crankcase ventilation valve, the method comprising:

predicting the presence of ice within the air intake system based upon an input to the engine control unit from at least one of the sensors;

starting the engine in response to an input from an operator of the vehicle; and modifying operation of the engine relative to normal operation, for a predetermined period of time, wherein modifying operation of the engine comprises:

advancing ignition timing, relative to a first ignition timing schedule, for a predetermined period of time; and operating the engine according to the first ignition timing schedule, wherein operating the engine is completed after the advancing ignition timing.

2. The method of claim 1, wherein:

the first ignition timing schedule is configured to facilitate optimum engine efficiency during normal operation of the engine.

3. The method of claim 1, wherein the plurality of sensors comprises an ambient temperature sensor, an engine intake air temperature sensor, an engine coolant temperature sensor, a vehicle speed sensor, a wind speed sensor, a positive crankcase valve temperature sensor and a mass airflow sensor, and wherein:

the predicting the presence of ice comprises processing the input, with the engine control unit, from at least one of the ambient temperature sensor, the engine intake air temperature sensor, the engine coolant temperature sensor, the vehicle speed sensor, the wind speed sensor, the positive crankcase valve temperature sensor and the mass airflow sensor.

4. The method of claim 3, wherein:

the predetermined period of time is determined by measuring a mass airflow through the engine using the mass airflow sensor.

* * * * *